UNITED STATES PATENT OFFICE.

MAX CONRAD, OF ASCHAFFENBURG, AND WALTER BECKH, OF DARMSTADT, GERMANY.

PROCESS OF MAKING PYRIMIDIN DERIVATIVES.

No. 811,828.   Specification of Letters Patent.   Patented Feb. 6, 1906.

Original application filed November 3, 1904, Serial No. 231,267. Divided and this application filed October 21, 1905. Serial No. 283,768.

*To all whom it may concern:*

Be it known that we, MAX CONRAD, professor of chemistry and doctor of philosophy, residing at Aschaffenburg, and WALTER BECKH, doctor of philosophy, residing at Darmstadt, Germany, subjects of the German Emperor, have invented certain new and useful Improvements in the Manufacture of Pyrimidin Derivatives, of which the following is a specification.

This invention has for its object the production of pyrimidin derivatives having the constitution denoted by alkyl-4-imino-2.6-dioxypyrimidins.

It consists in a process of condensing cyanacetic-acid esters with alkyl derivatives of urea—such as methyl-urea, ethyl-urea, symmetrical dimethyl-urea, or the like—in the presence of condensing agents, such as the alkali alcoholates, the alkali metals themselves, or their amids.

The following equation may serve to illustrate the principal reaction which takes place in the above-characterized condensation:

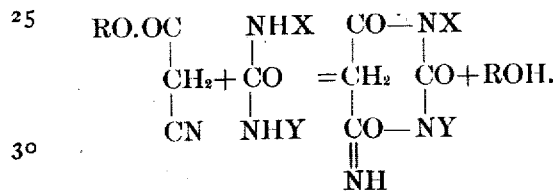

In this equation R and X are equal or different alkyl groups. Y is hydrogen or an alkyl group.

The essential characteristics of the process thus indicated will be seen from the following specific example:

Example: One hundred and thirteen parts of cyanacetic-acid ethyl ester are under proper refrigeration united with two hunhundred parts of xylol in which forty-six parts of sodium are finely distributed, and seventy parts of methyl-urea are added. The sodium for the most part gradually goes into solution. Thereupon for several hours longer the mixture is heated to about 100° to 120° centigrade. Then the brown-yellow melt is carefully taken up with water, the xylol is removed, and the 3-methyl-4-imino-2.6-dioxypyrimidin which is formed is precipitated with acetic acid.

The process proceeds in an analogous manner for the production of other alkyl-4-imino-2.6-dioxypyrimidin derivatives by condensing other alkyl or symmetrical dialkyl ureas with cyanacetic-acid esters in the presence of alkali condensing agents.

Having now described our invention and in what manner the same is to be performed, what we claim as new, and desire to secure by Letters Patent, is—

1. The process of producing alkyl-4-imino-2.6-dioxypyrimidins having the above-given general formula, which process consists in condensing alkyl-ureas of the above-characterized kind and cyanacetic-acid esters in the presence of alkali condensing agents, substantially as described.

2. The process of producing alkyl-4-imino-2.6-dioxypyrimidins having the above-given general formula which process consists in condensing alkyl-ureas of the above-characterized kind and cyanacetic-acid ethyl ester in the presence of alkali condensing agents, substantially as described.

3. The process of producing 3-methyl-4-imino-2.6-dioxypyrimidin, which process consists in condensing methyl-urea with cyanacetic-acid ethyl ester in the presence of an alkali condensing agent, substantially as described.

MAX CONRAD.
WALTER BECKH.

Witnesses:
 WALTER HOUSING,
 ERNST MENNEL.